United States Patent
Chu et al.

(10) Patent No.: US 8,868,573 B2
(45) Date of Patent: Oct. 21, 2014

(54) COMPUTING AND APPLYING ORDER STATISTICS FOR DATA PREPARATION

(75) Inventors: Yea J. Chu, Chicago, IL (US); Sier Han, Xi'an (CN); Fan Li, Xi'an (CN); Jing-Yun Shyr, Naperville, IL (US); Damir Spisic, Chicago, IL (US); Graham J. Wills, Naperville, IL (US); Jing Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/444,718

(22) Filed: Apr. 11, 2012

(65) Prior Publication Data
US 2013/0218909 A1    Aug. 22, 2013

Related U.S. Application Data

(63) Continuation of application No. 13/399,838, filed on Feb. 17, 2012, now abandoned.

(51) Int. Cl.
G06F 7/00    (2006.01)

(52) U.S. Cl.
USPC ......................................... 707/752

(58) Field of Classification Search
None
See application file for complete search history.

(56) References Cited

U.S. PATENT DOCUMENTS

| | | | |
|---|---|---|---|
| 6,108,658 A | 8/2000 | Lindsay et al. | |
| 6,847,924 B1 * | 1/2005 | Aldridge et al. | 703/2 |
| 2003/0033403 A1 * | 2/2003 | Rhodes | 709/224 |
| 2008/0059115 A1 | 3/2008 | Wilkinson | |
| 2009/0216470 A1 | 8/2009 | Yang et al. | |
| 2011/0082804 A1 | 4/2011 | Swinson et al. | |
| 2011/0093477 A1 | 4/2011 | Aldridge | |
| 2012/0303621 A1 * | 11/2012 | Newnham et al. | 707/737 |

OTHER PUBLICATIONS

Bennett, J., R. Grout, P. Pebay, D. Roe, and D. Thompson, "Numerically Stable, Single-Pass, Parallel Statistics Algorithms", [online], retrieved from the Internet at: <URL: http://janinebennett.org/index_files/ParallelStatisticsAlgorithms.pdf>, 2009, Total 8 pp.

Buragohain, C. and S. Suri, "Quantiles on Streams", [online], retrieved from the Internet at: <URL: http://www.cs.ucsb.edu/~suri/psdir/ency.pdf>, Encyclopedia of Database Systems 2009, Total 5 pages.

(Continued)

*Primary Examiner* — Apu Mofiz
*Assistant Examiner* — Thu Nga Nguyen
(74) *Attorney, Agent, or Firm* — Janaki K. Davda; Konrad, Raynes, Davda & Victor LLP

(57) ABSTRACT

Provided are techniques for generating order statistics and error bounds. For each of multiple, distributed data sources, a finite number of data bins are created for each field in that data source. Data values in each of the multiple, distributed data sources are processed to generate basic summaries for each of the data bins in a single pass of the data values. The data bins from each of the multiple, distributed data sources are sorted. One or more approximate order statistics are computed for a data set by accumulating counts from a number of the sorted data bins. Lower and upper error bounds are provided for each of the computed one or more approximate order statistics, wherein the lower and upper error bounds are values delimiting an interval containing a true value of an order statistic.

21 Claims, 13 Drawing Sheets

(56) References Cited

OTHER PUBLICATIONS

Choi, M., and B. Sweetman, "Efficient Calculation of Statistical Moments for Structural Health Monitoring", Journal of Structural Health Monitoring, Jan. 1, 2010, vol. 9, No.~1, 13-24, Total 27 pp.
Fu, L. and S. Rajasekaran, "Novel Algorithms for Computing Medians and Other Quantiles of Disk-Resident Data" [online], retrieved from the Internet at: <URL: http://www.engr.uconn.edu/~rajasek/Jdm1.pdf>, Proceedings of IDEAS, 2001, Total 21 pp.
Greenwald, M. and S. Khanna, "Space-Efficient Online Computation of Quantile Summaries", Proceedings of the 2001 ACM SIGMOD International Conference on Management of Data, May 21-24, 2001, Santa Barbara, California, United States, Total 9 pp. [Also pp. 58-66].
Guha, S. and A. McGregor, "Stream Order and Order Statistics: Quantile Estimation in Random-Order Streams", © 2009 Society for Industrial and Applied Mathematics, Siam J. Comput, vol. 38, No. 5, Total 16 pp.
Hinkley, D.V., "On Power Transformations to Symmetry", 1975, [online], [Retrieved on Sep. 28, 2011]. Retrieved from the Internet at: <URL: http://biomet.oxfordjournals.org/content/62/1/101.abstract>, Total 2 pp. [Abstract].
Hinkley, D.V., "On Power Transformations to Symmetry", Biometrika Trust, vol. 62, No. 1, Apr. 1975, Total 12 pp.
Hinkley, D., "On Quick Choice of Power Transformation", Journal of the Royal Statistical Society, Series C, (Applied Statistics), vol. 26, No. 1, 1977, Blackwell Publishing and Royal Statistical Society, Total 4 pp. [Received Apr. 1976. Revised Oct. 1976].
Manku, G.S., S. Rajagopalan, and B.G. Lindsay, "Random Sampling Techniques for Space Efficient Online Computation of Order Statistics of Large Datasets", Proceedings of the 1999 ACM SIGMOD International Conference on Management of Data, May 31-Jun. 3, 1999, Philadelphia, Pennsylvania, United States, Total 12 pp. [Also pp. 251-262].
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institute of Standards and Technology, Total 7 pp.
Rode, R.A. and V.M. Chinchilli, "The Use of Box-Cox Transformations in the Development of Multivariate Tolerance Regions with Applications to Clinical Chemistry", 1988, The American Statistician, vol. 42, No. 1 (Feb. 1988), Total 9 pp [Also pp. 23-30] [Also available at: http://www.jstor.org/pss/2685257].
U.S. Appl. No. 13/399,838, filed Feb. 17, 2012, entitled "Computing and Applying Order Statistics for Data Preparation", invented by Chu, Y.J., S. Han, F. Li, J. Shyr, D. Spisic, G.J. Wills, and J. Xu, Total 45 pp. [57.257 (Appln)].
Wikipedia, "Algorithms for Calculating Variance", [online], [Retrieved on Sep. 28, 2011]. Retrieved from the Internet at: <URL: http://en.wikipedia.org/wiki/Algorithms_for_calculating_variance>, Total 11 pp.
Office Action 1, dated Mar. 26, 2013, for U.S. Appl. No. 13/399,838, 21 pp. [57.257 (OA1)].
Response to Office Action 1, dated Jun. 26, 2013, for U.S. Appl. No. 13/399,838, 11 pp. [57.257 (ROA1)].
Notice of Allowance 1, dated Oct. 15, 2013, for U.S. Appl. No. 13/399,838, 12 pp. [57.257 (NOA1)].

* cited by examiner

| Field Storage | Data Condition | Metadata Specification |
|---|---|---|
| Any | Field has a single value. | Set the measurement level and the field role to None and field domain to Constant. |
| Any | Field contains exactly two non-missing values. | Set the measurement level to Flag. |
| String | Field contains significant portion of literal values and the number of different values is below a given threshold. | Set the measurement level to Nominal. |
| String | Field contains significant portion of literal values and the number of different values is above a given threshold. | Set the measurement level to None and the field role to Id. |
| String | Field contains predominantly numeric values. | Transform the field storage to an appropriate numeric type. Set the string values as missing. |
| Integer | All found values appear with frequency of one. | Set the measurement level to None and the field role to Id. |
| Integer or Real | Field contains consecutive integer values and their number is below a threshold. | Set the measurement level to Ordinal. |
| Integer or Real | Field contains non-consecutive values and their number is below a threshold. | Set the measurement level to Nominal. |
| Integer | The number of different values is above a given threshold. | Set the measurement level to Interval. |
| Real | The number of different values is above a given threshold. | Set the measurement level to Ratio. |
| Real | The number of different values is above a given threshold and some values appear with much higher frequency than others. | Set the measurement level to Ratio and specify the repeated values as missing. |

FIG. 9

| Field Storage | Measurement Level | Data Condition | Metadata Specification Adjustment |
|---|---|---|---|
| String | Ordinal, Interval or Ratio | Field contains significant portion of literal values. | Set the measurement level to Nominal or None. |
| String | Any | Field contains predominantly numeric values. | Transform the field storage to an appropriate numeric type. Set the string values as missing. |
| Any | Flag | Binary field contains more than two non-missing values. | Transform the measurement level to an appropriate value. |
| Any | Not Flag | Field contains exactly two non-missing values. | Transform the measurement level to Flag. |
| Integer or Real | Nominal | Field contains consecutive integer values and value labels are not specified. | Set the measurement level to Ordinal. |
| Any | Any | Field has a single value. | Set the measurement level to None and the field role to None and field domain to Constant. |
| Any | Nominal | Field contains a large number of unique values. | Set the measurement level to None and the field role to Id. |
| Real or Integer | Ordinal | Field contains a large number of unique values. | Set the measurement level to Interval. |
| Real | Interval or Ratio | Field contains some values with much higher frequency than others. | Specify the repeated values as missing. |
| Any | Any | Field contains certain values or range of data. | Set the appropriate field domain specification. |

FIG. 10

COMPUTING AND APPLYING ORDER STATISTICS FOR DATA PREPARATION

CROSS-REFERENCE TO RELATED APPLICATIONS

This application is a continuation of and claims the benefit of U.S. patent application Ser. No. 13/399,838, filed Feb. 17, 2012, which application is incorporated herein by reference in its entirety.

FIELD

Embodiments of the invention relate to computing and applying order statistics for data preparation.

BACKGROUND

Pervasiveness and quantity of electronic data available today in all areas of human endeavor call for new approaches in order to extract timely insights and actionable information based on the very large data sets encountered in practice. In addition to sheer data volume, research analysts face methodological challenges when encountering poorly described or irregular data, such as continuous data with non-normal data distribution.

Computation of order statistics and statistical data distributions, along with the other field summaries, is an important part of robust assessment of data properties, as well as, data preparation for further analyses. These summaries are useful in supporting data preparation and diagnostics features, such as outlier detection, histograms, and box plots that are based on order statistics and statistical data distribution. Moreover, non-normal data usually require transformation to normality for exploratory analysis and in preparation for modeling.

The cost of computing order statistics, statistical distributions, and straightening transformations is prohibitive for large and distributed data sets using available computation techniques. It requires either storage of impermissible amounts of data in the main computer memory or multiple data passes. Neither approach is efficient for processing of large distributed data sets. This is in contrast to available computation techniques for simple summaries, such as means or standard deviations, that are computed in a single data pass with modest memory storage requirements.

Some available computation techniques make the data ready for model building without the need for prior knowledge of the statistical concepts involved. Such available computation techniques do not support computation on distributed data sources and are inefficient for very large data sets requiring multiple data passes to accomplish several data transformation steps sequentially.

Some conventional approaches focus on computing quantiles with precision in a specified quantile range. Quantiles may be described as data values taken at regular intervals from a cumulative distribution function of a random variable. Dividing ordered data into q essentially equal-sized data subsets is the motivation for q-quantiles; the quantiles are the data values marking the boundaries between consecutive subsets. Put another way, the k-th q-quantile marks the boundary at the k/q fraction of the ranked data values and there are q−1 of the q-quantiles, one for each integer k satisfying 0<k<q. Here, a more general $\phi$-quantile specification, where $\phi$ is a real number with $0 \le \phi \le 1$, is used, and the $\phi$-quantile marks the boundary at the $\phi$ fraction of the ranked data values. When queried for a $\phi$-quantile whose se precise value is x, these conventional approaches return an element y that is guaranteed to be in the [$\phi-\epsilon$, $\phi+\epsilon$] quantile range. On the other hand, there are no guarantees for the precision of y in terms of the x itself. As a result, there can be uncontrolled errors in the location of the computed approximate order statistics, thus invalidating location-based statistical analysis. Moreover, the important information on the tails of the statistical distribution and their possible anomalies may be lost.

SUMMARY

Provided are a method, computer program product, and system for generating order statistics and error bounds. For each of multiple, distributed data sources, a finite number of data bins are created for each field in that data source. Data values in each of the multiple, distributed data sources are processed to generate basic summaries for each of the data bins in a single pass of the data values. The data bins from each of the multiple, distributed data sources are sorted. One or more approximate order statistics are computed for a data set by accumulating counts from a number of the sorted data bins. Lower and upper error bounds are provided for each of the computed one or more approximate order statistics, wherein the lower and upper error bounds are values delimiting an interval containing a true value of an order statistic.

BRIEF DESCRIPTION OF THE SEVERAL VIEWS OF THE DRAWINGS

Referring now to the drawings in which like reference numbers represent corresponding parts throughout:

FIG. 6 is formed by FIGS. 6A, 6B, and 6C.

FIG. 7 is formed by FIGS. 7A and 7B.

FIG. 9 illustrates metadata discovery rules in accordance with certain embodiments.

FIG. 10 illustrates metadata conformance rules in accordance with certain embodiments.

DETAILED DESCRIPTION

Figure 1:
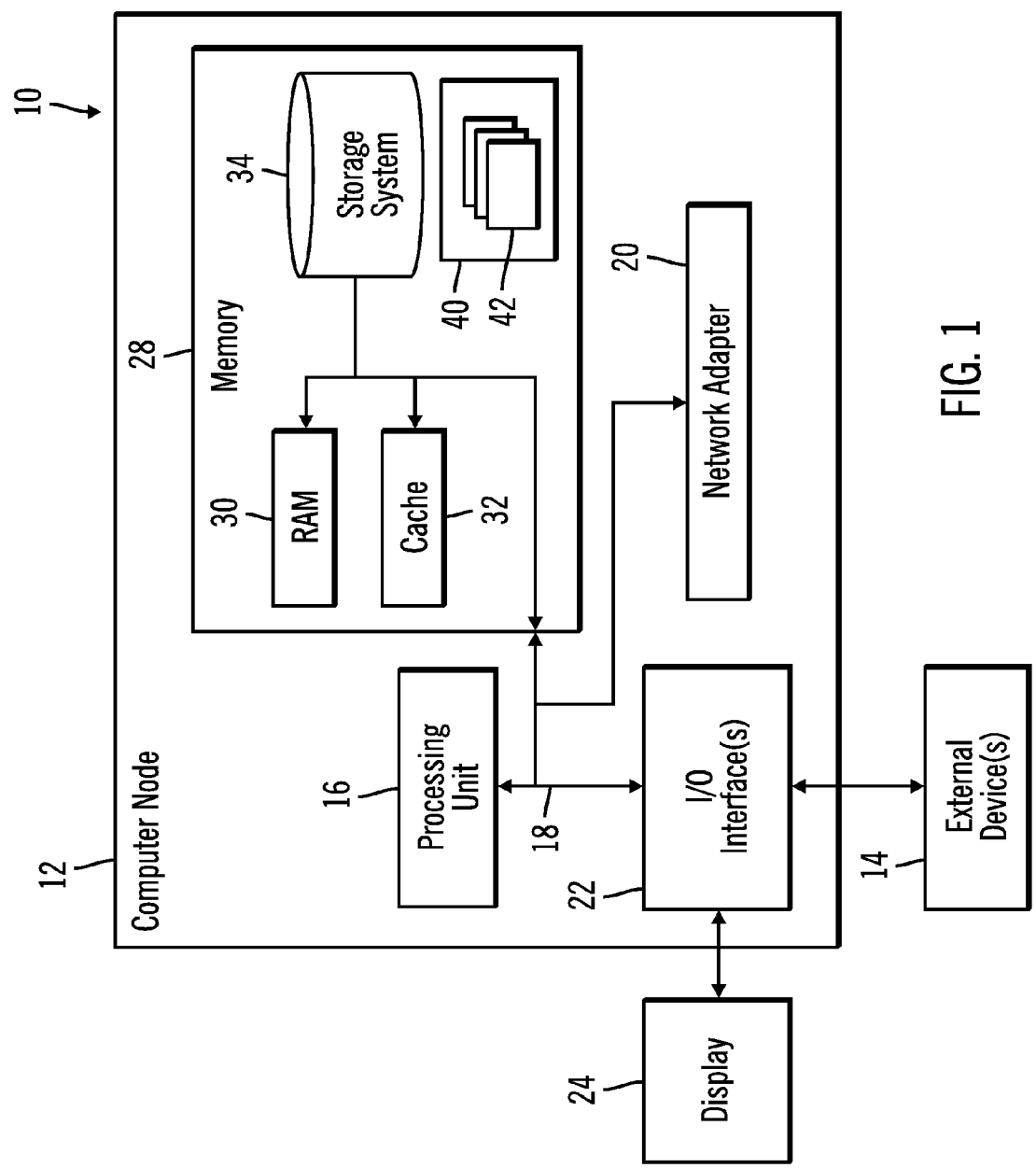
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
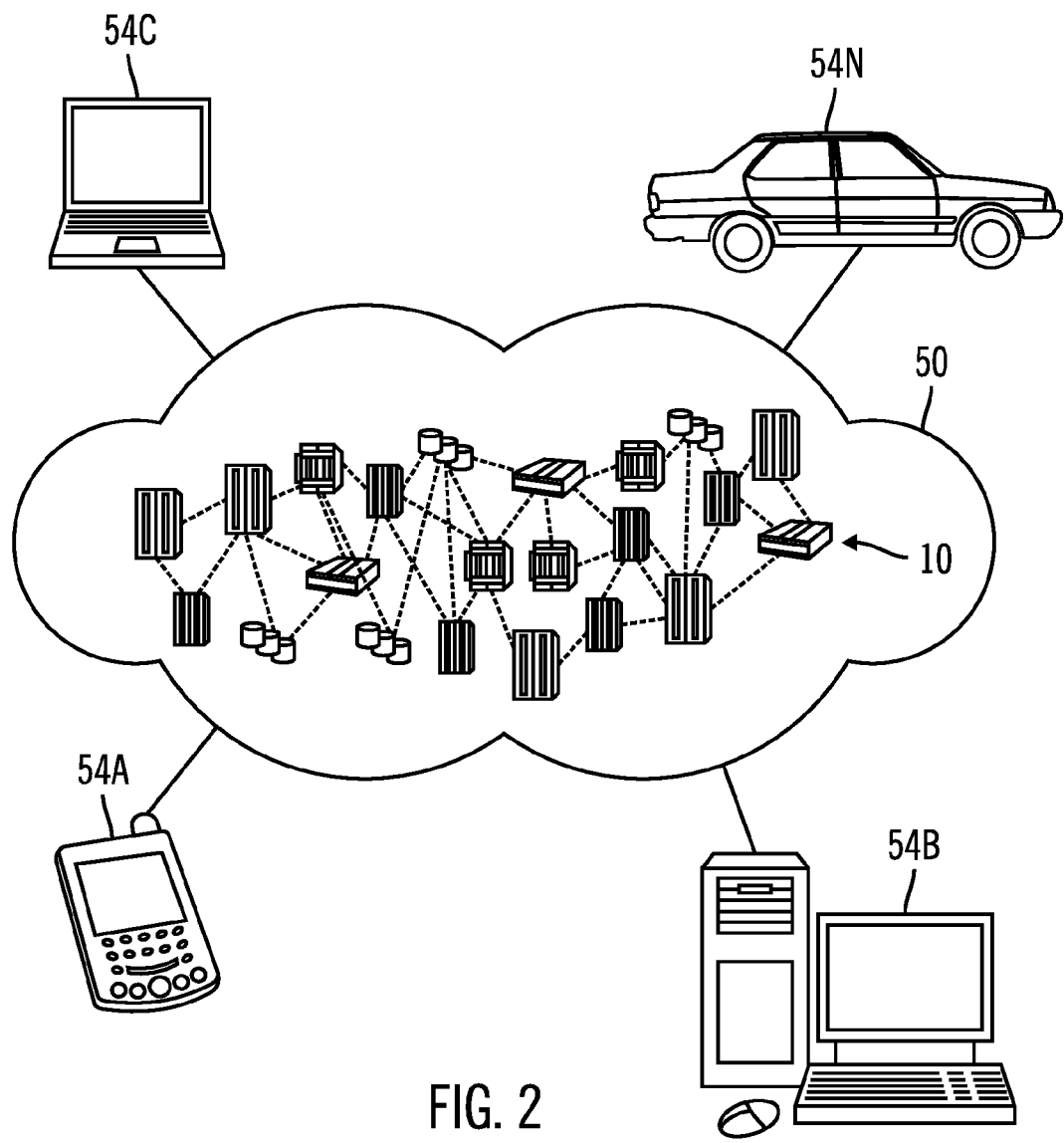
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
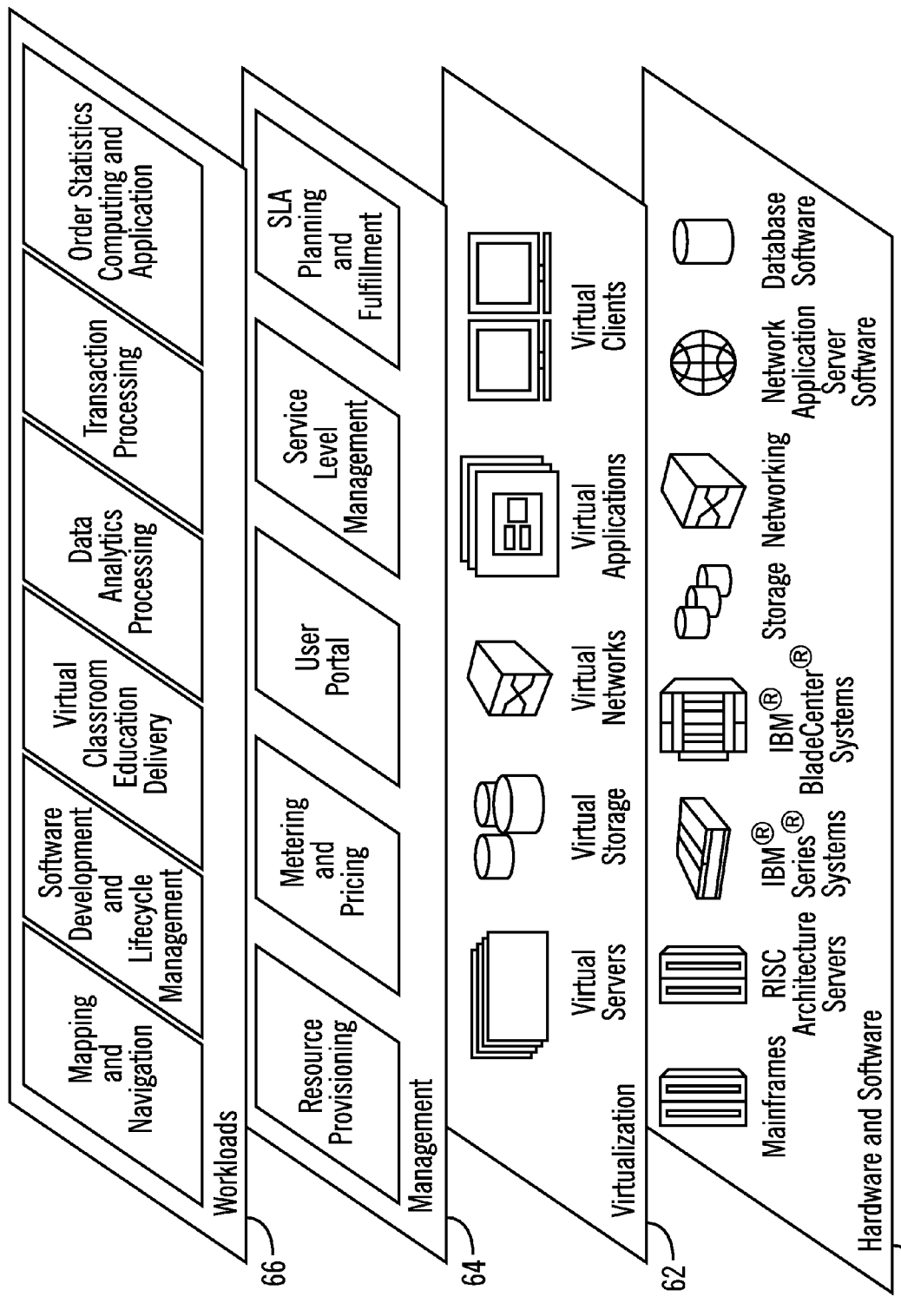
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and statistics computing and application.

Thus, in certain embodiments, software, implementing statistics computing and application in accordance with embodiments described herein, is provided as a service in a cloud environment.

Figure 4:
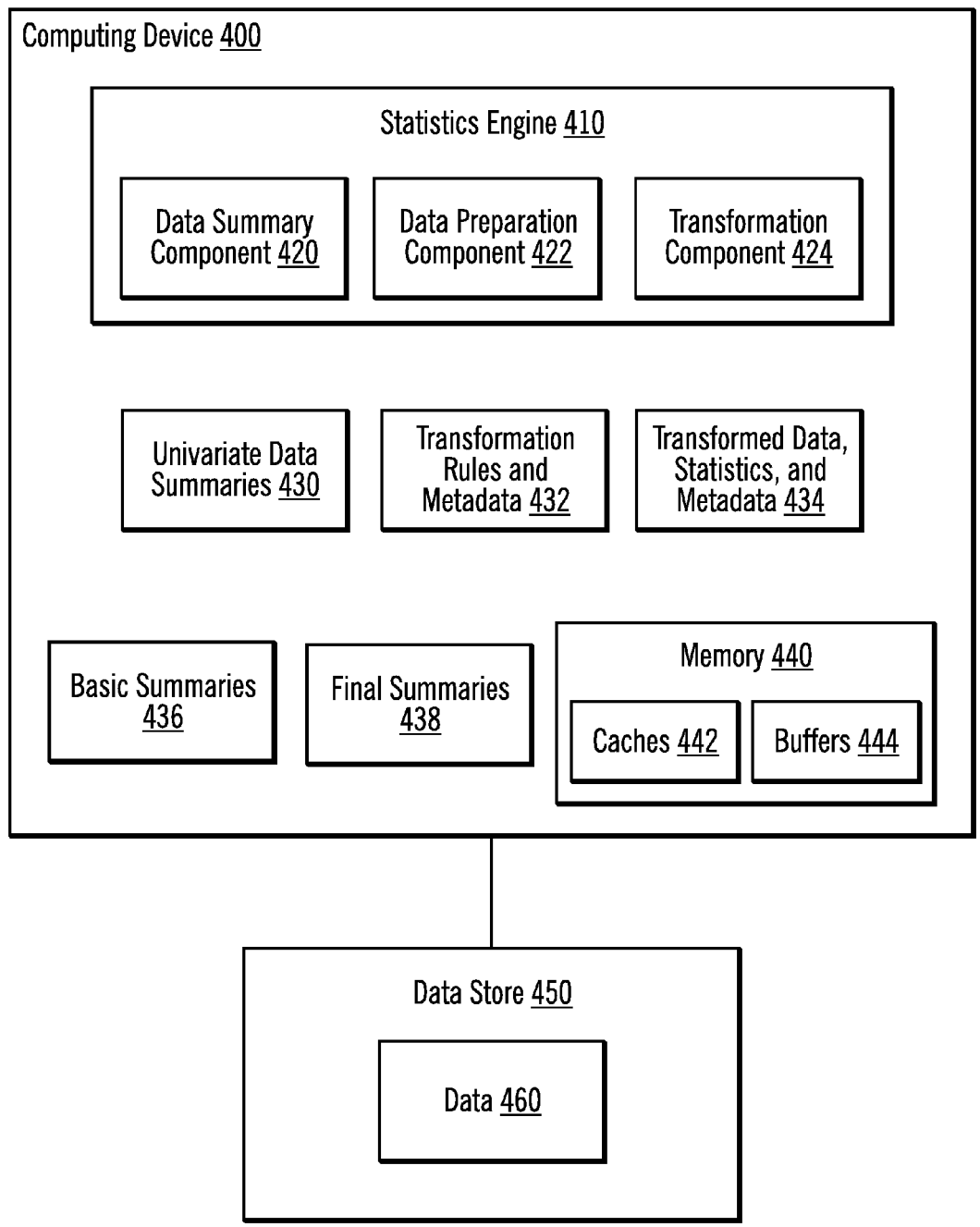
FIG. 4 illustrates a computing environment in accordance with certain embodiments.

FIG. 4 illustrates a computing environment in accordance with certain embodiments. A computing device 400 includes a statistics engine 410 for computing and applying robust statistics for data preparation. The statistics engine 410 includes a data summary component 420, a data preparation component 422, and a transformation component 424. The computing device 400 also includes univariate data summaries 430, transformation rules and metadata 432, transformed data, statistics, and metadata 434, basic summaries 436, final summaries 438, and memory 440. The computing device 400 is coupled to a data store 450, which stores data 460.

The memory 440 may be described as a collection of memory reserved for intermediate computations in all fields. The memory 440 may include caches 442 and/or buffers 444. In certain embodiments, there is one cache 442 per each numeric field and one buffer 444 per each string field.

Univariate data summaries 430 encompass all summaries. Univariate data summaries 430 are based on the whole dataset and include order statistics, statistical data distributions and other descriptive statistics, such as mean, variance, skewness, etc. The basic summaries 436 in each data bin (e.g., referenced in blocks 702a, . . . , 702n of FIG. 7A) are different from the univariate data summaries 430 and include the lower and upper bounds, count, and mean. Thus, basic summaries are used with reference to the data bins, and univariate data summaries are used with reference to the whole dataset.

The statistics engine 410 computes univariate data summaries 430 (such as order statistics, statistical data distributions, and other descriptive statistics) for each field in very large and distributed data sources. Data values for each field are aggregated into a finite-sized list of data bins based on their location. Basic summaries 436 (such as count, mean, minimum, and maximum) are maintained for each data bin, while the data values are discarded. These basic summaries 436 are further aggregated when merging data bins from different data sources of the distributed data. This approach uses a single data pass and is scalable since only a limited amount of memory is used per field. Final summaries 438 provide approximate order statistics with limited location errors, their deterministic error bounds, as well as, approximate statistical data distribution for each field. The summaries for categorical fields having a limited number of distinct values are exact. The computed approximate order statistics are of interest in data analysis because they realistically summarize the distribution of data and are less sensitive to outlying data values than the simple summaries (such as mean or variance).

The computed univariate data summaries 430 are used as inputs for the data preparation component 422 for generating statistical distribution plots, transformation rules for outlier detection, missing data handling, and distribution straightening transformations. In order to transform distributions to symmetry, certain embodiments use Box-Cox power transformations providing a continuum of transformation functions through an estimable parameter. The statistics engine 410 introduces a new approach based on the computed approximate order statistics to estimate the power transformation parameter. This approach provides a transformation insensitive to extreme values and it has no additional data access for obtaining the robust transformation rule.

Thus, the statistics engine 410 delivers univariate data summaries 430 and transformation rules and metadata 432 for robust data assessment and preparation.

Order statistics depict the features of original data and are mostly insensitive to extreme values. Computing the data preparation transformations based on the small number of approximate order statistics is more efficient than using a large volume of the original data. The statistics engine 410 generates scalable and robust univariate data summaries 430 in a single data pass, performs metadata discovery or conformance rule checking to guarantee measurement level specification, and generates data preparation rules based on the approximate order statistics. Also, the transformation component 424 executes generated transformation rules dynamically, while the data is read by the subsequent analytic components. The statistics engine 410 serves as the fundamental module for evaluating data quality and supporting exploratory data analysis and predictive modeling.

Figure 5:
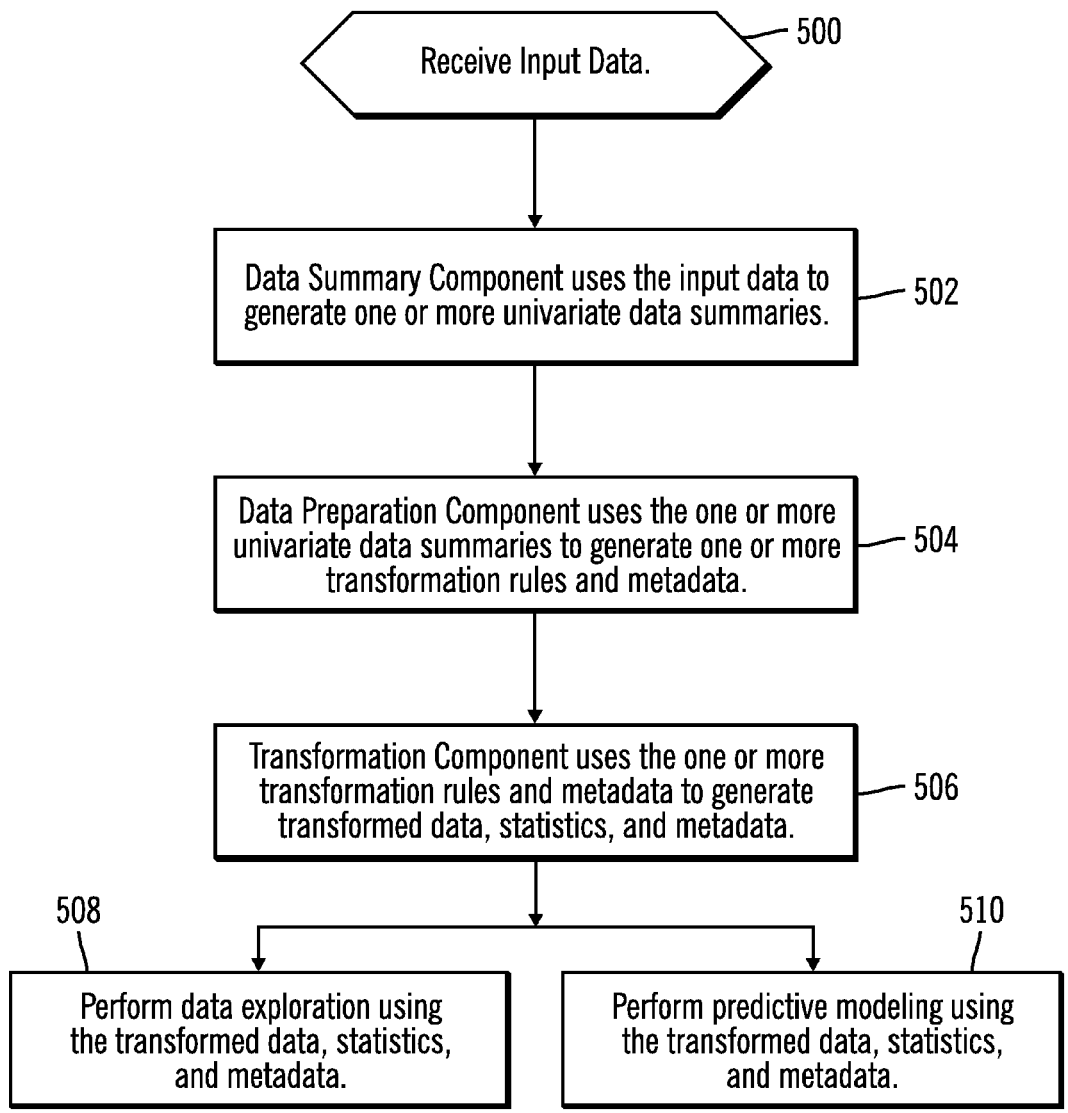
FIG. 5 illustrates, in a flow diagram, operations to compute and apply robust statistics for data preparation in accordance with certain embodiments.

FIG. 5 illustrates, in a flow diagram, operations to compute and apply robust statistics for data preparation in accordance with certain embodiments. Control begins at block 500 with the data summary component 420 receiving input data 460. In block 502, the data summary component 420 uses the input data 460 to generate one or more univariate data summaries 430. In block 504, the data preparation component 422 uses the one or more univariate data summaries 430 to generate one or more transformation rules and metadata 432. In block 506, the transformation component 424 uses the one or more transformation rules and metadata 432 to generate transformed data, statistics, and metadata 434. From block 506, processing may continue to blocks 508 and/or 510. In block 508, data exploration is performed by some analytic engine using the transformed data, statistics, and metadata 434. In block 510, predictive modeling is performed by some analytic engine using the transformed data, statistics, and metadata 434.

Data Summary Component

A metadata specification may be described as a specification of various properties for each field in the data set. Given a new data set with an undefined or an incomplete analytic metadata specification, the data summary component 420 executes the initial data pass for the purpose of generating univariate data summaries 430. This data pass produces approximate field distributions and order statistics that provide univariate statistics and support generating appropriate metadata specifications. This data pass is for the new data sets and the results remain available for any subsequent analyses.

The prior information requirement should be minimized for large and distributed data sources because extracting basic metadata information from them can be very expensive. The only information stored is the storage type of each data field: numeric or string. The data summary component 420 performs computation that consists of dispatching operations to each data source, stream computation in each data source, and a final consolidation stage.

Computation for a Numeric Field

For a numeric field, the dispatching operation parses computation requirements from an application, constructs the content and order of the computations, and dispatches the content and order of the computations to each data source.

When performing stream computation in each data source, the data summary component 420 treats the local data as a stream data source. The data values of each numeric field are aggregated into a list of data bins ("bin lists"). Each data bin represents a cluster of data values that specifies the smallest and the largest values, as well as, the count and the mean of the data values within that data bin. All counts in the data bins are weighted when appropriate. The data bins do not store the data values. After the data bin lists for the given field from different data sources are created, the data bin lists are combined together. In certain embodiments, the combined data bin list is sorted by the ascending order of the lower bounds of the data bins.

Order statistics (such as median, quartiles or percentiles) may be approximated from the combined data bin list without sorting the original field data values. Deterministic error bounds are provided for each of the one or more order statistics, and it can be proved that the true value of the related order statistic is within the estimated error bounds. The width of each data bin is maintained within limits bounded by the range of the data divided by the number of data bins per data source. The errors with their bounds can be controlled by the user through specifying the limit on the number of data bins. A larger number of data bins will result in smaller errors. The term "smaller" refers to the size of the error (i.e., the distance from the true values). The bounds on the error size become smaller with the larger number of data bins. Moreover, the achieved accuracy may be better due to the procedure exploiting larger gaps in the range of data values. That is, data bins are not necessarily adjacent, and larger gaps in data values are preserved as gaps between data bins. This results in tighter error bounds than calculated directly from the field range and the number of data bins. Thus, with embodiments, the maximal location errors are limited.

The data summary component 420 creates the data bin list for the field in each data source, and then estimates the error bounds based on the combined data bin list. Error bounds are based on the observed data values, and the size of the data bin list for each data source can be fixed in advance. The error bounds are deterministic and provide overall accuracy for the computed approximate order statistics.

Each data bin list is empty at the beginning of the data pass. New data values are added as new data bins containing a single data value, where lower bound, upper bound, and the mean are all equal. If a new data value falls between the lower and the upper bound of an existing data bin, the count and the mean for that data bin are updated with the data value.

As additional data values arrive, the size of the data bin list will reach a given threshold designed to conserve the memory usage. In this case, the data summary component 420 merges some of data bins to keep the size of the data bin list limited. Instead of performing merge whenever a new data bin is created, the data summary component 420 caches (i.e., stores in a cache 442 in memory 440) the new data bins to a temporary data bin list until the number of data bins in the cache 442 reaches a given size threshold. The data summary component 420 performs the merging procedure on the combined data bin list and the temporary data bin list in the cache 442.

Each pair of data bins that have the least distance between their means are merged together repeatedly until the threshold size of the data bin list is reached. When data bins are merged, the counts and the means are aggregated from the contributing data bins. The lower bound is set to the smaller of the two former lower bounds, while the upper bound is set to the larger of the two former upper bounds. An additional criterion for merging data bins is that width of the newly formed data bin should be less than twice the range divided by the number of data bins active for merging. This ensures that the final estimates have limited error bounds.

When merging the data bins, the first and the last S data bins are not involved in finding the nearest data bin pairs. S may be described as a specified constant that does not vary with the size of the data. Therefore, the S smallest values and the S largest values are preserved as potential outliers for a later data preparation. This feature preserves an accurate representation of the two tails of data distribution.

Figure 6A:
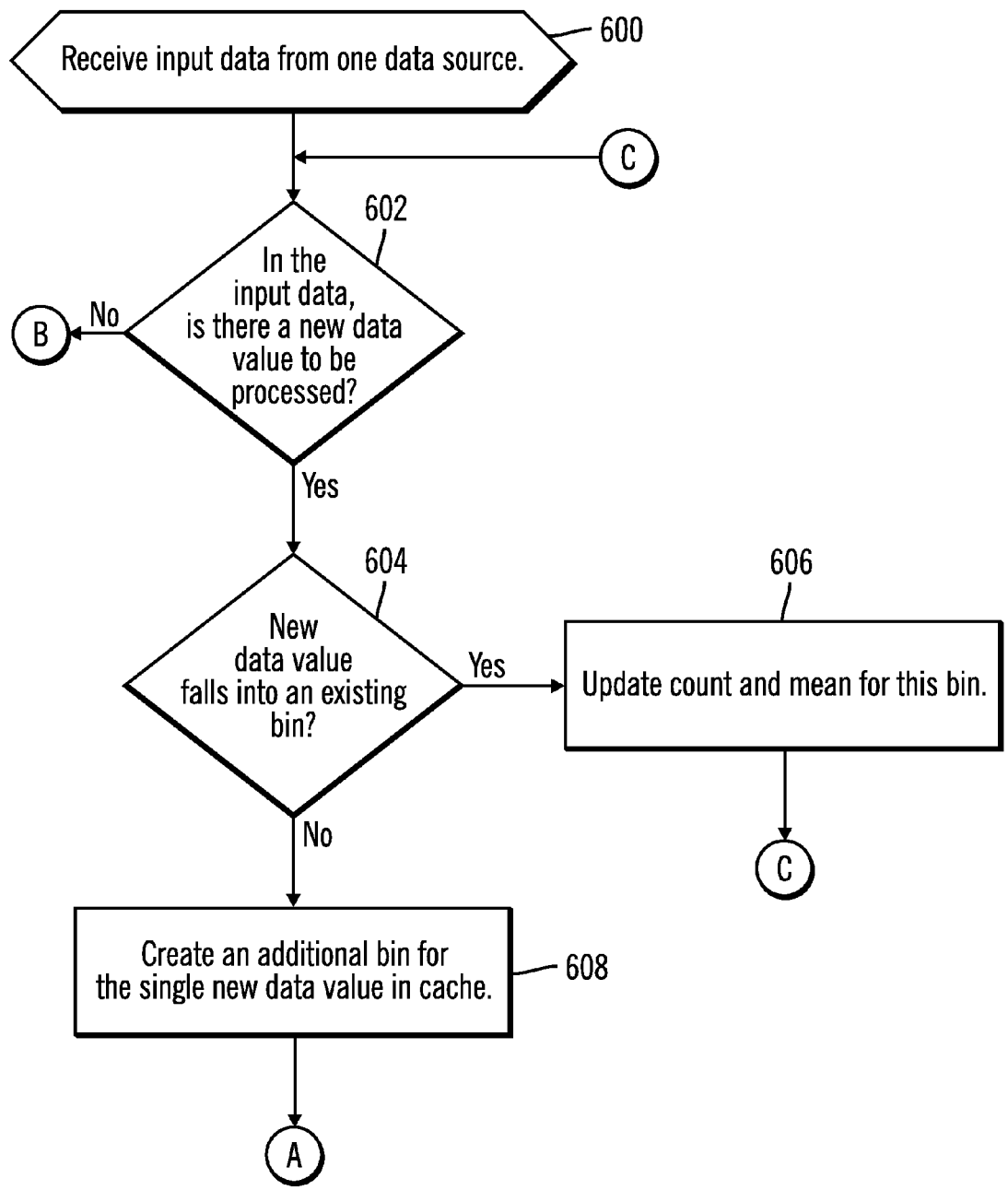
FIG. 6 illustrates in a flow diagram, operations for stream computation in each data source in accordance with certain embodiments.
Figure 6B:
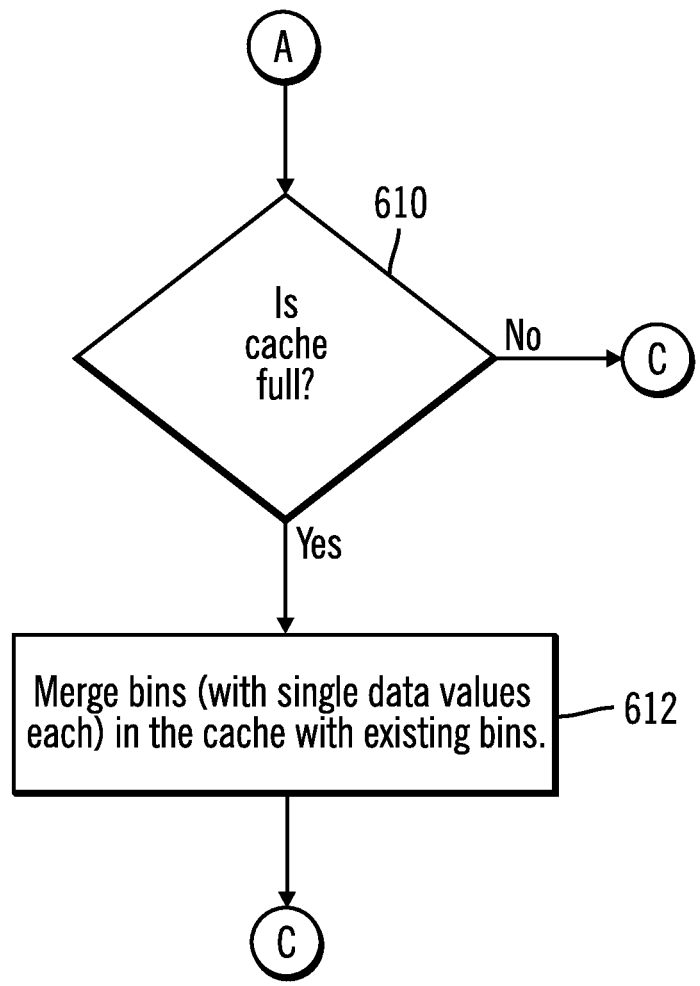
Figure 6C:
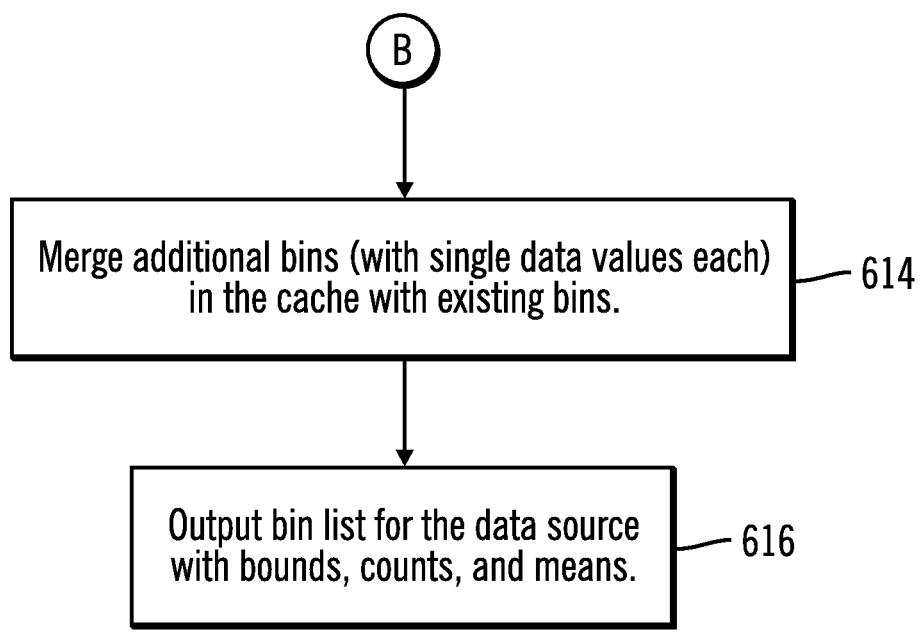

FIG. 6 illustrates in a flow diagram, operations for stream computation in each data source in accordance with certain embodiments. FIG. 6 is formed by FIGS. 6A, 6B, and 6C. Control begins at block 600 with the data summary component 420 receiving input data from one data source. In block 602, the data summary component 420 determining whether, in the input data, there is a new data value to be processed. The new data value represents a new data value for a field. If so, processing continues to block 604, otherwise, processing continues to block 614 (FIG. 6C).

In block 604, the data summary component 420 determines whether the new data value falls into an existing data bin. If so, processing continues to block 606, otherwise, processing continues to block 608.

In block 606, the data summary component 420 updates the count and the mean for this data bin. From block 606, processing returns to block 602 (FIG. 6A).

In block 608, the data summary component 420 creates an additional data bin for the single new data value in the cache 442.

In block 610, the data summary component 420 determines whether the cache 442 is full. If so, processing continues to block 612, otherwise, processing returns to block 602 (FIG. 6A).

In block 612, the data summary component 420 merges data bins with single data values each in the cache 442 with the existing data bins. From block 612, processing continues to block 602 (FIG. 6A).

From block 602, if there is no new data value to be processed in the input data, processing continues to block 614. In block 614, the data summary component 420 merges additional data bins with single data values each in the cache 442 with existing data bins. In block 616, the data summary component 420 outputs a data bin list for the data source with the bounds, counts, and means for each data bin.

Once each data source is processed in accordance with the processing of FIG. 6, specified quantiles are computed in a final consolidation stage. The count of every data bin from each data source is accumulated in the ascending order of the data bins' lower bounds until the accumulated count exceeds the count corresponding to the desired quantile. The estimated quantile value is the mean of the last accumulated data bin. The lower error bound of the estimated order statistics is the lower bound of the last accumulated data bin, and the upper error bound of the estimated order statistics is the largest upper bound of all the accumulated data bins. For example, the approximate median can be found by accumulating the counts of all data bins in ascending order of lower bounds until the accumulated count is larger than 50 percent of the total count. The approximate median equals the mean of the last accumulated data bin. The lower bound of the last accumulated data bin and the largest upper bound of all the accumulated data bins are the lower and the upper error bounds for the approximate median, respectively.

Figure 7A:
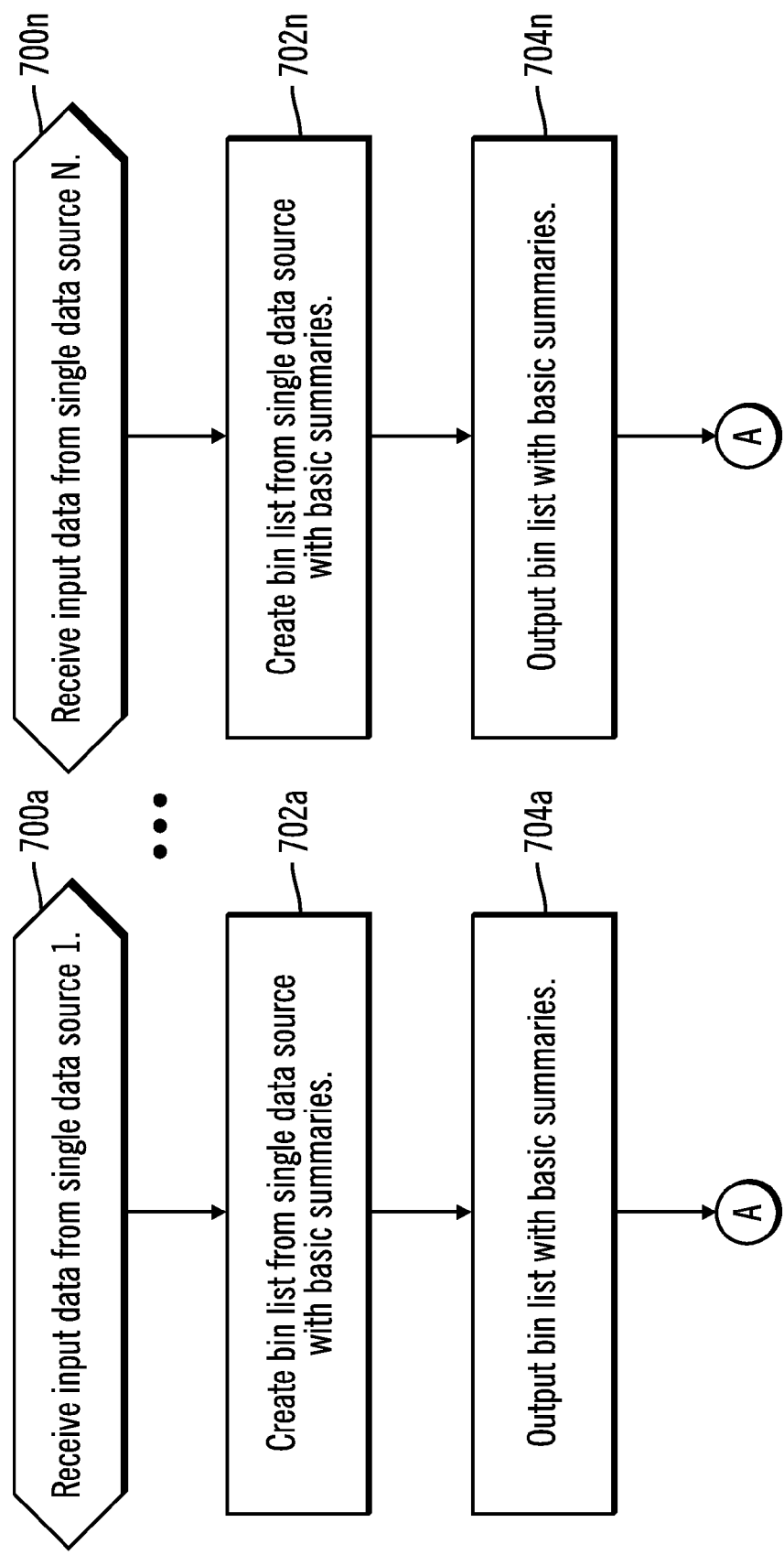
FIG. 7 illustrates, in a flow diagram, operations for computing approximate order statistics and error bounds from distributed data sources in accordance with certain embodiments.
Figure 7B:
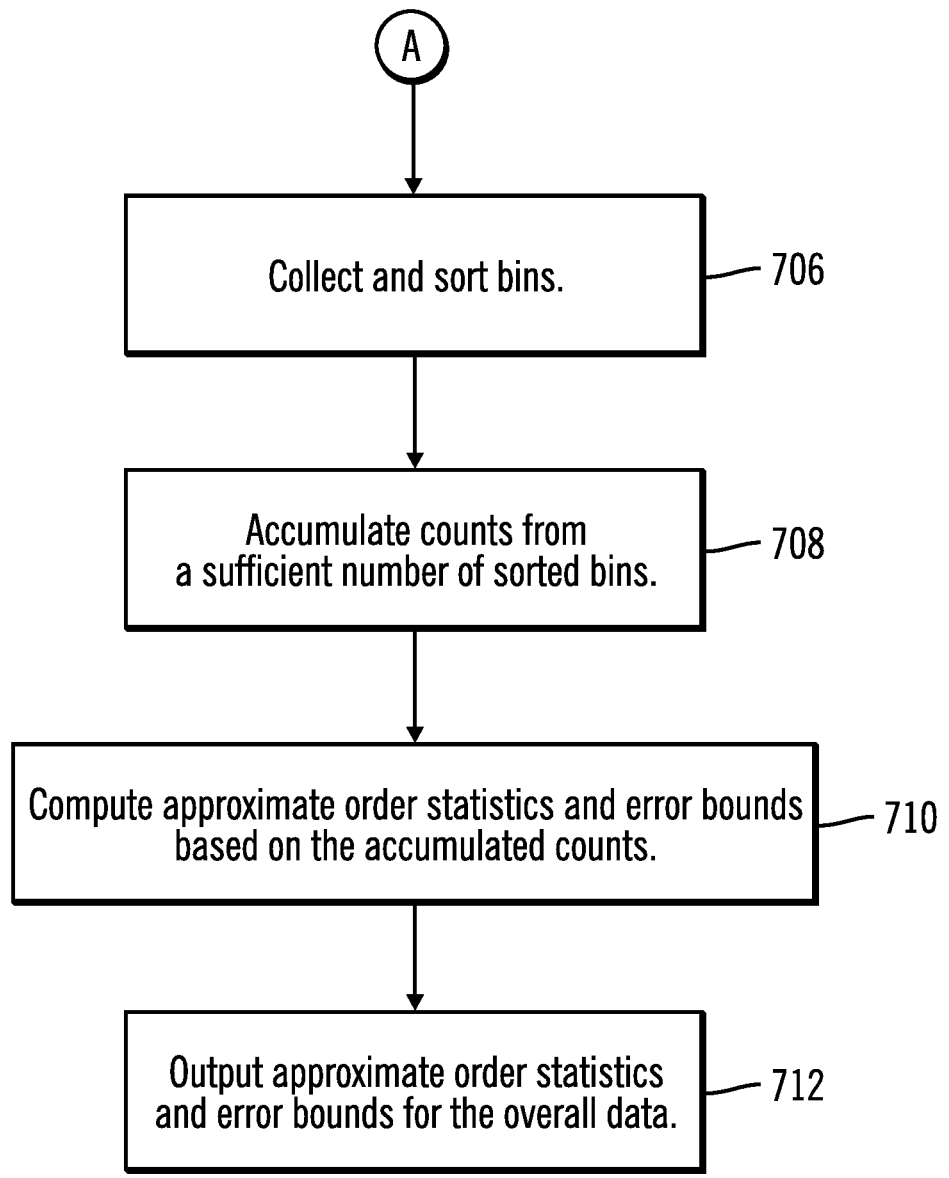

FIG. 7 illustrates, in a flow diagram, operations for computing approximate order statistics and error bounds from distributed data sources in accordance with certain embodiments. FIG. 7 is formed by FIGS. 7A and 7B. For each data source 1, . . . , N, the data summary component 420 receives input data from a single data source (block 700a, . . . , 700n), creates a data bin list from the singe data source with basic summaries 436 (block 702a, . . . , 702n), and outputs a data bin list with the basic summaries 436 (block 704*a*, . . . , 704*n*). The basic summaries 436 include the lower and upper bounds, counts, and means for each data bin list. That is, blocks 700*a*, . . . , *n*, 702*a*, . . . , 702*n*, and 704*a*, . . . , 704*n* represent the processing of FIG. 6 for each data source.

In blocks 706-712, the data bin lists and basic summaries 436 of each data source are combined. In block 706, the data summary component 420 collects and sorts (i.e., orders) data bins. In block 708, the data summary component 420 accumulates counts from a sufficient number of sorted (i.e., ordered) data bins. In certain embodiments, the term "sufficient" refers to the accumulated counts exceeding the counts corresponding to desired quantiles. In block 710, the data summary component 420 computes approximate order statistics and error bounds based on the accumulated counts. In block 712, the data summary component 420 outputs the approximate order statistics and error bounds for the overall data from all of the data sources, wherein the lower and upper error bounds are values delimiting the interval containing the true value of an order statistic for each computed approximate order statistic. In particular, the upper and lower bounds are provided along with each computed approximate order statistic. The true value lies in the interval between the lower and upper bound and, therefore, within limited distance from the computed approximate order statistic.

Computation for a String Field

For a string field, the dispatching operation parses computation requirements from an application, constructs the content and order of the computations, and dispatches the content and order of the computations to each data source.

Stream computation in each data source treats the local data as a stream data source.

In certain embodiments, a buffer 444 in memory 440 containing distinct values with corresponding count is maintained for each string field. If a given data string value is found in the buffer 444, its count is updated accordingly. Otherwise, a new distinct value is added to the buffer 444 and its frequency is set to the case weight. Once the buffer 444 contains M distinct string values, the new distinct values are no longer added into the buffer 444, and all the other string values are counted as a single group. M is set large enough to preserve the string field information and it also depends on the available memory.

In the final consolidation stage, the frequencies for the same distinct string value from all the data sources are added together, and the distinct string values with the largest L counts are selected to represent this field. If any of the contributing buffers 444 contains M distinct values, the final computed counts provide the lower bounds for the actual counts.

Data Preparation Component

To gain the metadata information and assure its validity, the data preparation component 422 generates appropriate metadata specifications based on the univariate data summaries 430 obtained from the data summary component 420. These specifications are either produced by applying the metadata discovery rules when no metadata information is available from the data source or updated by applying conformance rules when metadata is available but possibly mis-specified. Numeric field storage type can be specified as either integer or real.

The data preparation component 422 also implements various features after metadata specification, such as outlier detection and handling, missing value handling, Box-Cox transformation (which transforms distributions to symmetry), etc. These features use the approximate order statistics from the data summary component 420, as well as, the metadata specifications as input. Their output contains transformation rules for creating new fields. Using the approximate order statistics has two merits: (1) no additional data pass is required which saves time, especially for the very large data sets; and (2) it makes the transformations more robust against the extreme values in data.

Embodiments use the computed approximate order statistics in Box-Cox transformation. Specifically, the Box-Cox transformation function based on the original data $y_i$, i= 1, . . . , N, is specified as follows:

$$g(y_i, \lambda) = \begin{cases} \frac{((y_i - c)^\lambda - 1)}{\lambda} & \lambda \neq 0 \\ \ln(y_i - c) & \lambda = 0 \end{cases}$$

where c=min(y)−1 and $\lambda$ is the transformation parameter which is selected by grid search over a finite set [a, b] with increments to maximize the log-likelihood function:

$$L(\lambda) = -\frac{N}{2} \ln\left[\frac{N-1}{N}(sd(g(\lambda)))^2\right] + (\lambda - 1)\sum_{i=1}^{N} \ln(y_i - c),$$

where $sd(g(\lambda))$ is the standard deviation of Box-Cox transformation of y values.

Embodiments use approximate order statistics instead of the original data to estimate the transformation parameter $\lambda$ by a grid search with the maximum log-likelihood value, i.e., replace $y_i$, i=1, . . . , N, in the above log-likelihood function with percentiles, $p_i$, i=0, 1, . . . , 100, where $p_i$ is the $i^{th}$ percentile value so $p_0$ is the minimum and $p_{100}$ is the maximum. Then the original data $y_i$, i=1, . . . , N, are transformed by the Box-Cox transformation function. Embodiments avoid one data pass and improve speed of the Box-Cox transformation as 101 values may be used no matter how large the data set is. Moreover, experiments indicate the estimated transformation parameter, which is the transformation rule, based on the percentiles is close to that based on the original data.

Figure 8:
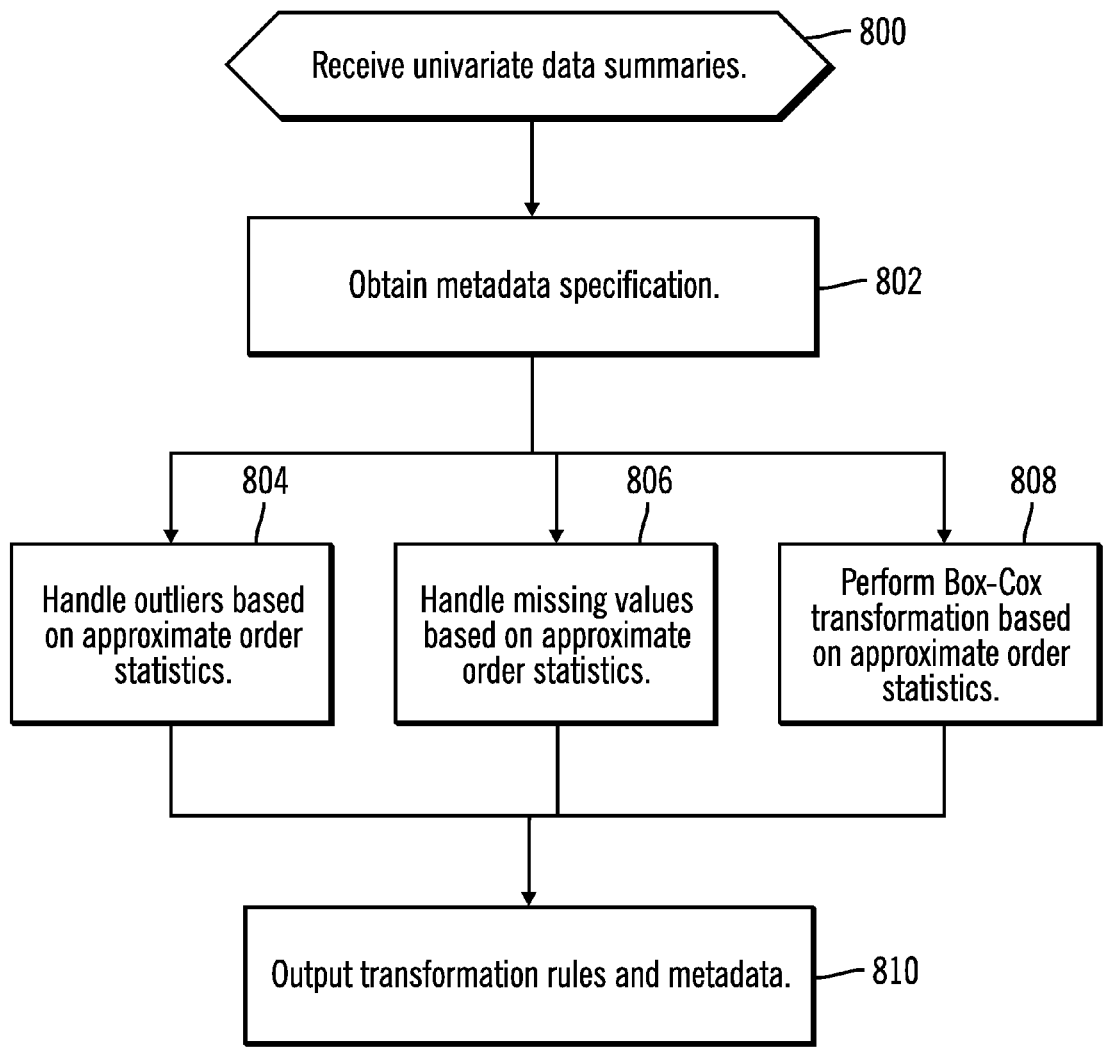
FIG. 8 illustrates, in a flow diagram, operations for generating transformation rules and metadata in accordance with certain embodiments.

FIG. 8 illustrates, in a flow diagram, operations for generating transformation rules and metadata in accordance with certain embodiments. Control begins at block 800 with the data preparation component 422 receiving univariate data summaries 430. In block 802, the data preparation component 422 obtains one or more metadata specifications by applying the metadata discovery rules when no metadata information is available from the data source or updated by applying conformance rules when metadata is available but possibly mis-specified. That is, in block 802, the data preparation component 422 performs metadata discovery and conformance rule checking From block 802, processing continues to blocks 804, 806, and 808.

In block 804, the data preparation component 422 handles outliers based on approximate order statistics. In block 806, the data preparation component 422 handles missing values based on approximate order statistics. In block 808, the data preparation component 422 performs Box-Cox transformation based on approximate order statistics. From blocks 804, 806, and 808, processing continues to block 810.

In block 810, the data preparation component 422 outputs transformation rules and metadata.

FIG. 9 illustrates metadata discovery rules 900 in accordance with certain embodiments. FIG. 10 illustrates metadata conformance rules 1000 in accordance with certain embodiments.

Transformation Component

The transformation component 424 executes any transformations generated by the data preparation component 422 and passes the corresponding values to other data consuming components for data exploration and predictive modeling. The scalable and distributed mechanism for executing the data transformations is processing the data in a distributed file system. The transformation component 424 generates values for the new variables specified by the transformation rules. Both the original and the transformed fields are presented as data to the subsequent analytic components. No additional data passes are necessary for generating the transformed values since the transformation rules are record-based and can be executed concurrently with data reading required for the input to the modeling components.

The transformation component 424 completes the flexible system of extracting robust statistics from the original data, creating appropriate transformation rules, and executing them on an as needed basis.

Thus, the statistics engine 410 provides a solution for delivering summaries and transformation rules needed for robust data assessment and preparation. The statistics engine 410 computes univariate data summaries 430, including robust order statistics and statistical distributions, for analysis of irregular, large and distributed data sources. The statistics engine 410 computes approximate order statistics with limited location errors and their deterministic error bounds. Moreover, the statistics engine 410 generates the data transformations for data exploration and data preparation for modeling based on the acquired robust summaries. The statistics engine 410 is useful for an increasing number of large and distributed data source installations found in business, government, and industry.

The statistics engine 410 calculates approximate order statistics in a single data pass, with limited location error bounds. Also, the statistics engine calculates the Box-Cox transformation parameter based on the computed approximate order statistics, rather than on the original data.

The statistics engine 410 approximates the order statistics for each field in a single data pass from distributed data by creating data bins for each distributed data source, collecting data bins from all distributed data sources, sorting the data bins, and calculating approximate order statistics by accumulating counts from a sufficient number of ordered data bins. The statistics engine 410 reports deterministic error bounds for each approximate order statistic, and the errors with their bounds can be controlled through specifying the limit on the number of data bins as the larger number of data bins will result in smaller errors.

The statistics engine 410 uses a predefined number of data bins for each data source without making any assumptions about data, while the boundaries of the data bins are dynamically adjusted. The statistics engine 410 creates a set of data bins for each field and for each data source such that only a small number of basic summaries 436 are maintained for each data bin.

The statistics engine 410 is able to extract robust statistics from the original data and create appropriate transformation rules in a single data pass and deliver statistics transformation rules for data exploration and predictive modeling. In particular, the statistics engine 410 creates a limited, finite number of data bins for each field and for each distributed data source such that only a small number of basic summaries 436 are maintained for each data bin; collects data bins from each distributed data source and sorts them; calculates approximate order statistics for the overall data set by accumulating counts from a sufficient number of ordered data bins; provides error bounds which are values delimiting the interval containing the true value of an order statistic for each computed approximate order statistic; discovers or verifies metadata properties based on the computed summary statistics; applies the computed approximate order statistics to generate data transformation rules for outlier and missing value handling; calculates power transformation parameters for Box-Cox transformation using the computed approximate order statistics; and generates the corresponding transformation rule.

The statistics engine 410 also creates a set of data bins for each distributed data source by: generating a data bin of zero width for each of the predetermined number of the initial data values; adding further data values to the existing data bins and updating basic summaries 436 when any new point values can be placed within the existing data bin bounds; creating preset number of additional data bins for the points whose values cannot be placed within any of the existing data bin bounds; setting the approximation bound proportional to the range of the values divided by the predetermined number of data bins; and merging the additional data bins with the existing data bins in batches by adjusting the data bin summaries to reflect the merged data bins when number of data bins exceeds a preset threshold and ensuring that the closest data bins are merged first and that width of the merged data bins does not exceed the approximation bound.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-8 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for generating order statistics and error bounds, comprising:
   for each of multiple, distributed data sources, using a processor of a computer, creating a finite number of data bins for each field in that data source;
   processing data values in each of the multiple, distributed data sources to generate basic summaries for each of the data bins in a single pass of the data values, wherein the basic summaries for each of the data bins includes a count of data values in that data bin that is updated as another new data value is processed for that data bin and a mean value of the data values in that data bin that is updated as another new data value is processed for that data bin;
   sorting the data bins from each of the multiple, distributed data sources;
   computing one or more approximate order statistics for a data set by accumulating the counts and the mean values from a number of the sorted data bins;
   providing lower and upper error bounds for each of the computed one or more approximate order statistics, wherein the lower and upper error bounds are values delimiting an interval containing a true value of an order statistic for an associated approximate order statistic.

2. The method of claim 1, wherein software is provided as a service in a cloud environment.

3. The method of claim 1, wherein the basic summaries for a data bin comprises a lower bound for that data bin and an upper bound for that data bin.

4. The method of claim 1, further comprising:
   calculating a power transformation parameter for a Box-Cox transformation using the computed one or more approximate order statistics.

5. The method of claim 1, further comprising:
   for each of the finite number of data bins, generating a data bin of zero width; and
   in response to receiving a new data value,
       determining whether the new data value is to be added to an existing data bin;
       in response to determining that the new data value is to be added to the existing data bin,
           adding the new data value to the existing data bin; and
           updating basic summaries of the existing data bin;
       in response to determining that the new data value is not to be added to the existing bin, creating a new data bin for the new data value; and
           creating basic summaries for the new data bin.

6. The method of claim 5, further comprising:
   merging each new data bin with the existing data bins in batches by adjusting the basic summaries of each data bin involved in a merge when the number of data bins exceeds a preset threshold and while ensuring that width of the merged data bins does not exceed an approximation bound.

7. The method of claim 1, wherein a width of each data bin is maintained within limits bounded by a range of data values divided by the finite number of data bins.

8. A computer system for generating order statistics and error bounds, comprising:
   a processor; and
   a storage device connected to the processor, wherein the storage device has stored thereon a program, and wherein the processor is configured to execute instructions of the program to perform operations, wherein the operations comprise:
       for each of multiple, distributed data sources, creating a finite number of data bins for each field in that data source;
       processing data values in each of the multiple, distributed data sources to generate basic summaries for each of the data bins in a single pass of the data values, wherein the basic summaries for each of the data bins includes a count of data values in that data bin that is updated as another new data value is processed for that data bin and a mean value of the data values in that data bin that is updated as another new data value is processed for that data bin;
       sorting the data bins from each of the multiple, distributed data sources;
       computing one or more approximate order statistics for a data set by accumulating the counts and the mean values from a number of the sorted data bins;

providing lower and upper error bounds for each of the computed one or more approximate order statistics, wherein the lower and upper error bounds are values delimiting an interval containing a true value of an order statistic for an associated approximate order statistic.

9. The computer system of claim 8, wherein the basic summaries for a data bin comprises a lower bound for that data bin and an upper bound for that data bin.

10. The computer system of claim 8, wherein the operations further comprise:
calculating a power transformation parameter for a Box-Cox transformation using the computed one or more approximate order statistics.

11. The computer system of claim 8, wherein the operations further comprise:
for each of the finite number of data bins, generating a data bin of zero width; and
in response to receiving a new data value,
determining whether the new data value is to be added to an existing data bin;
in response to determining that the new data value is to be added to the existing data bin,
adding the new data value to the existing data bin; and
updating basic summaries of the existing data bin;
in response to determining that the new data value is not to be added to the existing data bin, creating a new data bin for the new data value; and
creating basic summaries for the new data bin.

12. The computer system of claim 11, wherein the operations further comprise:
merging each new data bin with the existing data bins in batches by adjusting the basic summaries of each data bin involved in a merge when the number of data bins exceeds a preset threshold and while ensuring that width of the merged data bins does not exceed an approximation bound.

13. The computer system of claim 8, wherein a width of each data bin is maintained within limits bounded by a range of data values divided by the finite number of data bins.

14. The computer system of claim 8, wherein software is provided as a service in a cloud environment.

15. A computer program product for generating order statistics and error bounds, the computer program product comprising:
a non-transitory computer readable storage medium having computer readable program code embodied therewith, the computer readable program code, when executed by a processor of a computer, is configured to perform:
for each of multiple, distributed data sources, creating a finite number of data bins for each field in that data source;
processing data values in each of the multiple, distributed data sources to generate basic summaries for each of the data bins in a single pass of the data values, wherein the basic summaries for each of the data bins includes a count of data values in that data bin that is updated as another new data value is processed for that data bin and a mean value of the data values in that data bin that is updated as another new data value is processed for that data bin; sorting the data bins from each of the multiple, distributed data sources;
computing one or more approximate order statistics for a data set by accumulating the counts and the mean values from a number of the sorted data bins;
providing lower and upper error bounds for each of the computed one or more approximate order statistics, wherein the lower and upper error bounds are values delimiting an interval containing a true value of an order statistic for an associated approximate order statistic.

16. The computer program product of claim 15, wherein the basic summaries for a data bin comprises a lower bound for that data bin and an upper bound for that data bin.

17. The computer program product of claim 15, wherein the computer readable program code, when executed by the processor of the computer, is configured to perform:
calculating a power transformation parameter for a Box-Cox transformation using the computed one or more approximate order statistics.

18. The computer program product of claim 15, wherein the computer readable
program code, when executed by the processor of the computer, is configured to perform: for each of the finite number of data bins, generating a data bin of zero width; and in response to receiving a new data value,
determining whether the new data value is to be added to an existing data bin; in response to determining that the new data value is to be added to the existing data bin,
adding the new data value to the existing data bin; and updating basic summaries of the existing data bin;
in response to determining that the new data value is not to be added to the existing data bin, creating a new data bin for the new data value; and
creating basic summaries for the new data bin.

19. The computer program product of claim 18, wherein the computer readable program code, when executed by the processor of the computer, is configured to perform:
merging each new data bin with the existing data bins in batches by adjusting the basic summaries of each data bin involved in a merge when the number of data bins exceeds a preset threshold and while ensuring that width of the merged data bins does not exceed an approximation bound.

20. The computer program product of claim 15, wherein a width of each data bin is maintained within limits bounded by a range of data values divided by the finite number of data bins.

21. The computer program product of claim 15, wherein software is provided as a service in a cloud environment.

* * * * *